United States Patent [19]

Kozyrski

[11] Patent Number: 4,545,515
[45] Date of Patent: Oct. 8, 1985

[54] SHEET CUTTING MACHINE
[75] Inventor: Vincent T. Kozyrski, Plainville, Conn.
[73] Assignee: Fletcher-Terry Corporation, Farmington, Conn.
[21] Appl. No.: 628,498
[22] Filed: Jul. 6, 1984
[51] Int. Cl.[4] .......................... B26D 7/27; B26F 3/00
[52] U.S. Cl. ..................................... 225/96.5; 225/2; 83/582; 83/614; 83/699; 83/824; 83/879
[58] Field of Search .................. 225/96.5, 2; 83/879, 83/582, 614, 824, 698, 699

[56] References Cited

U.S. PATENT DOCUMENTS

| | | |
|---|---|---|
| 2,814,163 | 11/1957 | Krulwich . |
| 3,138,308 | 6/1964 | Oakley . |
| 3,259,286 | 7/1966 | Le Gras . |
| 3,399,586 | 9/1968 | Insolio et al. . |
| 3,532,260 | 10/1970 | Augustin et al. . |
| 3,587,953 | 6/1971 | Stehle . |
| 3,866,449 | 2/1975 | Wakabayashi et al. . |
| 3,889,862 | 6/1975 | Insolio et al. . |
| 4,005,808 | 2/1977 | Insolio . |
| 4,009,813 | 3/1977 | Insolio et al. . |
| 4,018,372 | 4/1977 | Insolio . |
| 4,049,167 | 9/1977 | Guissard ................... 225/96.5 X |

OTHER PUBLICATIONS

Catalog Insert Form No. CP-7554-77, The Fletcher-Terry Company.

*Primary Examiner*—Frank T. Yost

[57] ABSTRACT

A machine for manually cutting glass, plastic and mat employs a head having a unique breaker assembly by which the break-out of scored plastic sheet is readily effected, and in which the pillar post for the cutting element is supported to provide a blade repositioning feature. The head also includes means for maintaining the cutting element in its extended position, particularly to enhance effectiveness for cutting fibrous or cellular mat, cardboard, and the like.

20 Claims, 11 Drawing Figures

SHEET CUTTING MACHINE

BACKGROUND OF THE INVENTION

Manually operated machines have been used for many years in hardware stores, fabricating operations, etc., for cutting sheets of various materials into pieces. Such machines have conveniently taken the form of vertically mounted wall units comprised of a horizontal shelf for supporting the sheet stock, and parallel vertical tubes for guiding the cutting head. Interchangeable cutting elements are generally provided, including a wheel for driving a fissure in glass, and blades for scoring plastic and for slicing cardboard, foam core mat, and like materials.

The glass and plastic sheets must be separated, or "broken out", following scribing or scoring, since the cutting element does not normally completely sever the material. For this purpose an inverted V-shaped anvil may be positioned along the cutting path, to provide an underlying raised ridge upon which the scored sheet may be forced and broken.

In the case of glass, which has a very high modulus of elasticity, the simple hand application of a bending moment at the bottom of the score is generally sufficient to instantaneously complete the cut. Plastic, however, is much more difficult to sever because of its relatively low modulus of elasticity.

Thus, as the bending moment is applied and the cut begins to propagate, or run along the sheet, the point of severance becomes progressively further from the point at which the force is applied. This, and the inherent flexibility of the plastic material, make it extremely difficult to maintain a breaking moment at right angles to the score line; the break-out therefore tends to veer away from the score and to wander, following a random but generally curved path.

Prior art machines have endeavored to overcome this difficulty by use of a separate break-out tool, in the form of a hand lever, as described in Insolio et al U.S. Pat. No. 3,889,862. In use, the tool is inserted between the parallel guide tubes of the machine and the plastic sheet, and is forced upon the sheet to run the score a distance of several inches; the lever is moved progressively along the score line to produce a series of snapping actions, ultimately to separate the pieces along the entire length of the sheet. Although effective, the quality of the cut edge produced in this manner tends to be inconsistent, revealing minor aberrations where each short break terminates.

Other U.S. patents which disclose means for cutting glass and/or plastic include the following: U.S. Pat. Nos. 2,814,163 Krulwich; Oakley 3,138,308; LeGras 3,259,286; Insolio et al 3,399,586; Augustin et al 3,532,260; Stehle et al 3,587,953; Wakabayashi et al 3,866,449; Insolio 4,005,808; Insolio et al 4,009,813; and Insolio 4,018,372. Krulwich, for example, describes the use of a spring plate as a mandrel for breaking scored glass sheet, and LeGras uses a "diablo" to apply bending force for the same purpose. No. 4,005,808 to Insolio is directed to a cutting method for plastic, in which a scoring tool is inserted into a cross-slide to produce a score-line in the plastic sheet. The tool is thereafter inverted and used to force a V-shaped block toward a fixed mandrel, which deforms the sheet and creates a fissure; the sheet is then manually deflected to finally break the score. Insolio U.S. Pat. No. 4,018,372 teaches the use of spaced, prestress wheels in cooperation with an underlying reaction roller to cut relatively thick glass sheet. The cutting tool and the force-applying rollers are hydraulically operated for retraction and extension during appropriate phases of the operation.

A highly effective manual cutting machine is commercially available from the Fletcher-Terry Company of Farmington, Conn., which is designed for use with interchangeable pillar posts having cutting elements for plastic, glass and mat. The pillar post assembly is supported by a floating rocker arm, which is spring loaded to maintain a uniform force during the cutting or scoring operation, and a trigger arm is provided to elevate the cutting tool at the completion of the cutting stroke. The cutting head is slidably supported upon parallel tubular guide rails by bearing mounts which extend laterally from its opposite sides.

Despite all of such activity in the art, still a demand remains for a manual sheet cutting machine that is capable of smooth and highly effective operation to produce optimal scoring of glass and plastic sheets, and to produce high quality cutting of any of a variety of materials.

Thus, primary objects of the present invention are to provide a novel cutting head, and a novel manual sheet cutting machine utilizing such a head, which are highly effective and facile to use for cutting glass, plastic and mat materials, and by which cuts of high quality can readily and consistently be produced.

Another object of the invention is to provide such a cutting head and machine which are of relatively uncomplicated design and durable construction, and are smooth and comfortable in operation.

SUMMARY OF THE DISCLOSURE

It has now been found that certain of the foregoing and related objects of the invention are readily attained in a cutting head adapted for use in a manual sheet cutting machine, comprising an elongated body having cutter and breaker assemblies thereon, and including a handle portion and means for supporting the head for movement along a cutting path. The cutter assembly includes an elongated rocker arm having a head portion adjacent the forward end of the body, the rocker arm being pivotably mounted on the body for movement of the head portion between downwardly extended and upwardly retracted positions. It also includes a cutting member having a cutting element thereon, and means for removably mounting the cutting member on the head portion of the rocker arm, the mounting means being so constructed as to cooperate with the cutting member to permit slight longitudinal shifting of the cutting element, and to bias the cutting member rearwardly against such shifting. Means is provided for biasing the rocker arm toward the extended position of the head portion, and first means is provided on the body, accessible from the handle portion thereof, for operating the rocker arm. Thus, the first operating means can be moved in one direction to elevate the rocker arm from the extended position toward the retracted position, and can be moved in another direction to maintain the rocker arm in the extended position against upward deflection. The breaker assembly includes a carriage pivotably mounted on the body and having a shaft portion extending transversely thereacross, the carriage also being movable between downwardly extended and upwardly retracted positions of the shaft portion. A set of rollers is rotatably mounted on the shaft portion, and comprises a generally cylindrical central roller and a matched pair of outer rollers disposed outwardly of the ends thereof. The central roller has a shallow circumferential groove extending about its midsection to define oppositely directed, inwardly tapered generally conical sections thereon, and the outer rollers are of a diameter larger than the maximum diameter of the central roller. Means is provided for biasing the carriage toward the retracted position, and second operating means is provided on the body, accessible from the handle portion thereof, for forcing the carriage toward its extended position against the biasing means. The cutting head is effective for cutting glass, mat, and plastic sheet in a range of thicknesses. In use for cutting plastic, the mounting means of the cutter assembly will permit deflection of the cutting element by contact upon the edge of the sheet at the commencement of a scoring operation, and will, upon disengagement, reposition the element to a point adjacent the sheet edge; the rollers will serve to cleanly break the sheet thereafter.

In the preferred embodiments of the cutting head, the supporting means will comprise three bearing mount portions, two of which are longitudinally aligned on one side of the body, the other being disposed on the opposite side. Each of the mount portions will have a passageway extending longitudinally through it for slidably receiving one of a pair of parallel tubular guide rails, and will have a separate sleeve bearing element engaged therein for sliding contact upon the associated rail.

Most desirably, each of the sleeve bearing elements will be fabricated from a rigid, resiliently deformable material, and will comprise a tubular body portion received in the passageway of the corresponding mount portion, and an annular flange portion extending outwardly from about one end of the body portion and seated upon the surrounding surface of the mount portion. The sleeve element is split along one side by a continuous slit extending through the flange portion and generally longitudinally along the body portion. This will permit relative movement of the marginal portions of the element into an overlapped relationship, thereby diminishing the effective circumferential dimensions and facilitating insertion of the sleeve element into the passageway of the mount portion. The body of the cutting head will advantageously have a rectilinear slot adjacent the surface of each of the bearing mount portions and extending perpendicularly to the passageway therethrough. The slot engages the edge of the annular flange portion of the sleeve bearing element, to effectively prevent its displacement from the mount portion surface. The bearing elements will normally be fabricated from a synthetic resinous material having a high level of toughness and durability and a low coefficient of friction, and preferably the slit therein will extend generally helically along the tubular portion.

Generally, the cutting member used in the cutting head will comprise a pillar post having the cutting element mounted adjacent one end, and having a groove extending transversely thereacross intermediate its opposite ends to cooperatively engage the mounting means of the rocker arm head portion. The latter will include a detent member biased into engagement within the groove, thereby securing the cutting member while permitting its pivotal movement about the detent member. Typically, the detent member will comprise a spring-loaded plunger mounted within the head portion of the rocker arm, and will have a rounded tip received in the groove of the pillar post, the latter being defined by inwardly tapered sidewalls to permit such engagement and pivoting action.

Most desirably, the mounting means of the head portion will comprise a slot extending therethrough in a direction generally perpendicular to both the longitudinal axis and also the axis of pivoting of the rocker arm (i.e., along an anterior-posterior axis therethrough), in which the pillar post of the cutting member is seated, and the slot will be enlarged in the longitudinal direction of the rocker arm to permit such shifting of the cutting element. More specifically, the cutting element of the cutting member may be especially adapted for scoring plastic sheet material, and will include a slanted blade which terminates rearwardly at a point formed at the intersection with an edge that extends generally parallel to the axis of the pillar post. Engagement of the rearward edge of the blade upon the edge of the plastic sheet at the commencement of cutting operations will, as a result of the mounting means construction described, cause the pillar post to pivot and the cutting element to shift forwardly. Elevation of the rocker arm to disengage the cutting element from the edge of the sheet will permit the biasing force of the mounting means to return the cutting element to its normal position, so that upon lowering of the rocker arm the blade point will contact the sheet slightly inwardly of the edge thereof.

The rocker arm will advantageously have an elongated adjusting member adjacent the rearward end of the body and extending therethrough on an anterior-posterior axis, the member being adjustable to vary the position of the head portion. The cutting head may additionally include a lock-out mechanism to maintain the rocker arm in a position elevated from its extended position, which mechanism may comprise an outwardly biased bolt, slidably mounted in the body for movement on a transverse axis, and aligned for contact by the upper end of the adjusting member. The lock-out bolt will include a relatively small inner end portion, to establish the extended position of the rocker arm by contact of the adjusting member thereon, and a relatively large outer end portion to similarly establish its elevated position. The biasing force upon the bolt will not be of sufficient strength to overcome the frictional force between the larger end portion thereof and the adjusting member, which will therefore automatically maintain the bolt in its inwardly disposed, lock-out position; elevation of the rocker arm will, however, permit the biasing means to return the bolt to its outward position.

The rocker arm may include a pair of pins or lug elements projecting laterally, one above the other, from one side of the arm, and the "first" operating means will include a foot component extending generally longitudinally between the laterally projecting elements. Force in one direction (generally rearwardly) upon the first operating means will cause the foot component to contact the upper one of the projecting elements, to elevate said rocker arm; force in the opposite direction will effect contact with the lower projecting element, to transmit a downward bias upon the rocker arm by which the extended position thereof can be maintained against upward deflection. The first operating means will beneficially comprise a generally L-shaped trigger, with one element providing the foot component and the generally perpendicular element being disposed to permit thumb-contact access from the handle portion of the elongated body, the trigger being pivotably supported on the body substantially at the intersection of the two elements.

In other preferred embodiments, the carriage of the breaker assembly will comprise a pair of lateral arms pivotably attached to the elongated body adjacent the forward end thereof, supporting the shaft portion in a position spaced rearwardly therefrom and additionally including a transversely extending tie bar for cooperative engagement and actuation by the "second" operating means. The central roller will be mounted between the arms, and the outer rollers will be disposed outwardly thereof. Desirably, the second operating means will comprise a generally L-shaped lever having a longitudinal foot component for contacting the tie bar of the carriage, and a generally perpendicular arm component disposed to permit thumb-contact access from the handle portion of the body, the lever being pivotably attached to the body substantially at the intersection of its two components. Most desirably, the conical sections of the central roller will be tapered at an angle of approximately five degrees, so that the circumferential groove extending thereabout will have a wide, generally V-shaped cross-sectional configuration with an angle of approximately 170° between the surfaces of the two conical sections.

Additional objects of the invention are attained by the provision of a manual sheet cutting machine, including a cutting head as described herein and a support unit therefor. The support unit will include an elongated base portion comprised of a generally V-shaped anvil, and a pair of parallel rigid tubes adjacently disposed thereon, the tubes serving to support the cutting head for sliding movement along a cutting path across the unit. It may additionally include a sheet-supporting member disposed adjacent one end of the elongated base portion and projecting at a right-angle thereto, the sheet-supporting member providing a shelf on which the sheet material can be disposed during the cutting operation. Preferably, the sheet-supporting member will comprise a squaring edge bar extending therealong and providing direct underlying support for the sheet, and being adjustable with respect to the remainder of the supporting member to permit angular adjustment relative to the base portion. The inclined surfaces of the anvil of the base portion will normally form an angle that is substantially the counterpart to that formed between the conical sections of the central roller of the breaker assembly, and preferably, therefore, the surfaces have an angle of 190° therebetween.

DETAILED DESCRIPTION OF THE ILLUSTRATED EMBODIMENT

Figure 1:
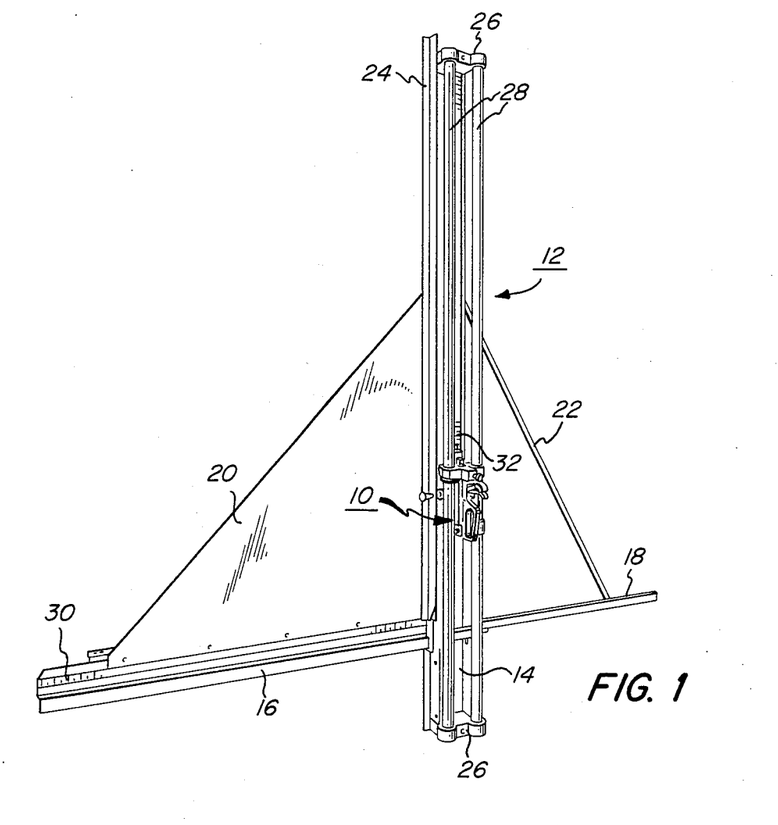
FIG 1 is a perspective view of a machine embodying the present invention.

With reference initially to FIG. 1 of the drawings, therein illustrated is a sheet cutting machine embodying the present invention and consisting of a cutting head, generally designated by the numeral 10, and a supporting unit, generally designated by the numeral 12 and adapted to be mounted (by means not shown) in a generally vertical position upon a wall. The unit 12 consists of a vertical anvil or mandrel member 14, and support shelves 16, 18 extending horizontally in opposite directions therefrom. A connecting web or face plate 20 extends between the shelf 16 and the anvil member 14, and assists in supporting the sheet material to be cut; the shelf 18 serves primarily to hold the cut pieces, and is supported near its free end by a strap or brace 22. A clamping bar 24 is assembled with the vertical member 14 to further assist in supporting the material being cut, and particularly to keep thin plastic sheet and mat from buckling.

A bracket 26 is affixed to each of the opposite ends of the member 14, and a pair of rigid tubular guide rails 28 are supported therebetween on parallel axes, equidistantly spaced from the axis of the anvil member 14, to mount the cutting head 10 for sliding movement thereover. Horizontal and vertical scales 30, 32, are also provided, to facilitate the cutting of sheets to measured lengths.

Figure 2:
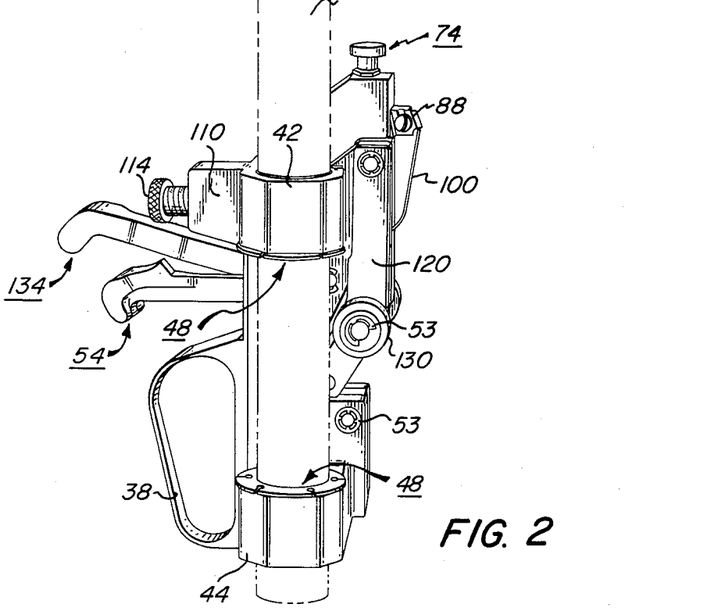
FIG. 2 is a perspective view of the cutting head utilized in the machine, drawn to a scale enlarged from that of FIG. 1, and showing, in phantom line, one of the tubular rails on which it is mounted.
Figure 3:
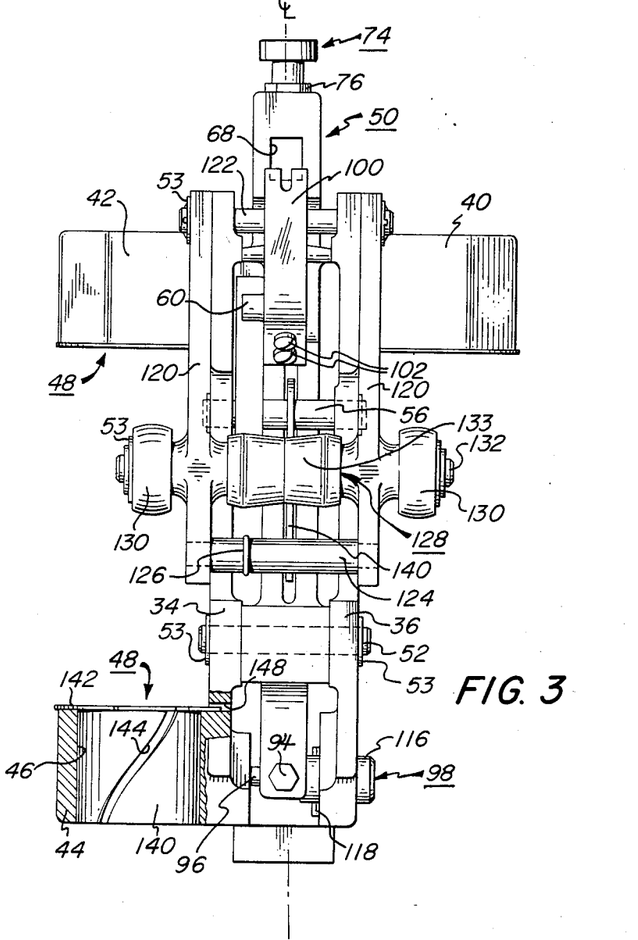
FIG. 3 is a bottom view of the cutting head, drawn to a further enlarged scale and having one of the bearing mounts in section to show the sleeve bearing element seated therewithin.
Figure 4:
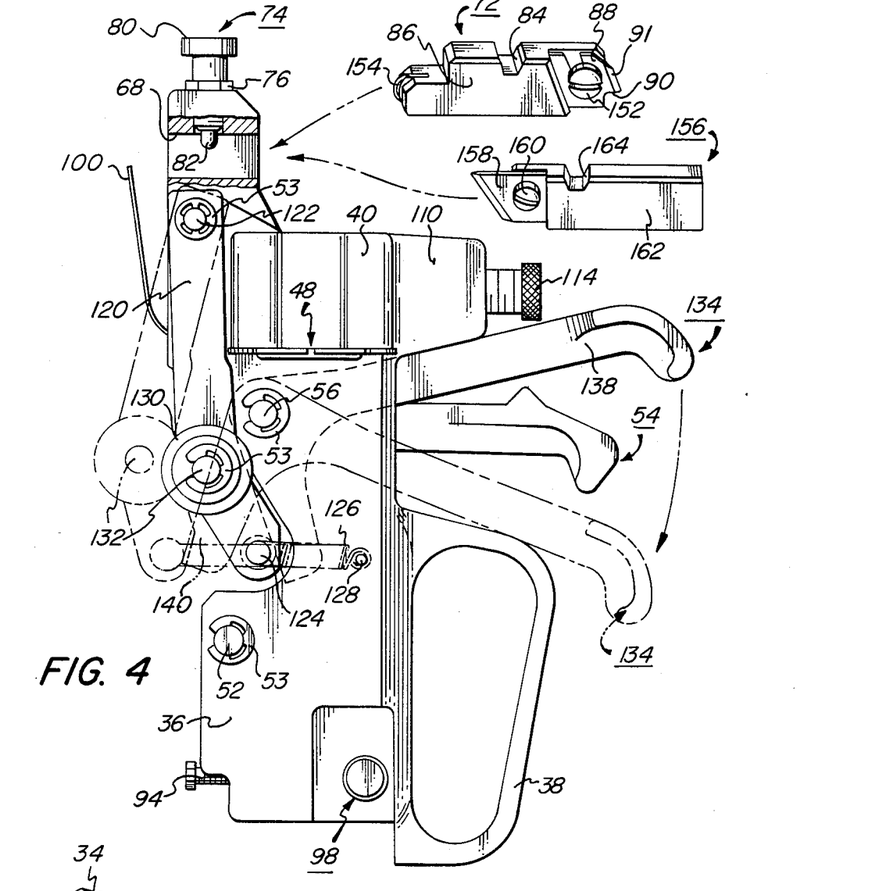
FIG. 4 is a side elevational view of the cutting head, in partial section, showing the carriage of the breaker assembly in retracted and extended positions, in full and phantom line respectively, and showing two pillar post units which may be mounted interchangeably within the head portion of the rocker arm.

With particular reference now to FIGS. 2-4, the body of the cutting head 10 is seen to consist of a pair of side plate portions 34, 36, three bearing mount portions 40, 42, 44 extending laterally therefrom and generally perpendicularly thereto, and a handle portion 38 disposed therebetween substantially on the longitudinal axis and the posterior side of the cutting head. Each of the bearing mounts 40, 42, 44 has a passageway 46 extending through it on an axis parallel to the longitudinal axis of the head, to receive the guide rails 28, mount portions 42, 44 being aligned on one side and portion 40 being disposed on the other. A bearing sleeve element 48, which will be described in detail hereinbelow, is seated within the passageway of each mount portion to provide a low-friction contact surface, to thereby facilitate sliding movement along the tubular rails 28.

Figure 6:
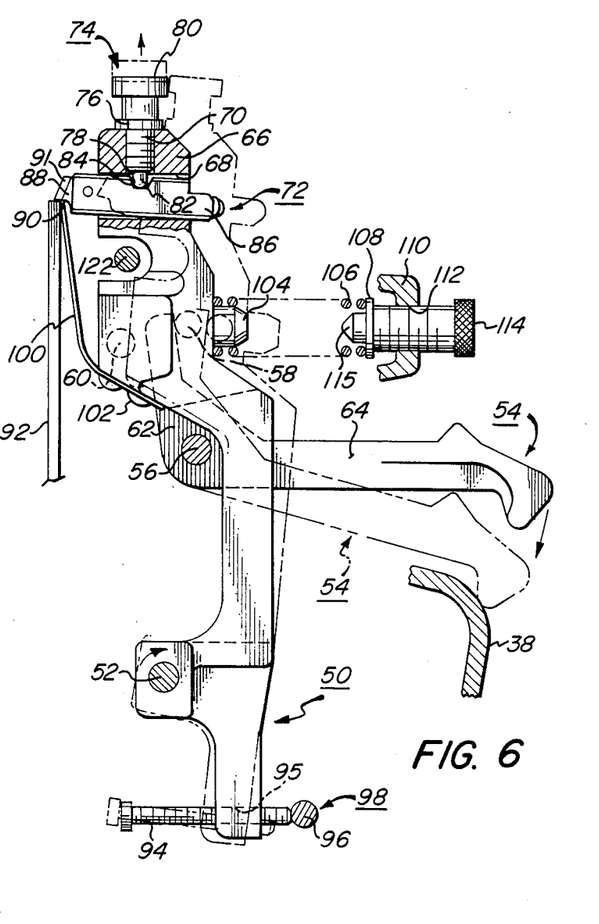
FIG. 6 is a fragmentary, side elevational view of the cutting assembly of the cutting head, drawn to the scale of FIG. 4 and showing the extended and retracted positions thereof in full and phantom line, respectively, showing the engaged and disengaged positions of the pillar post retaining plunger in full and phantom line, respectively, and showing the blade of the cutting member displaced from its normal position by contact upon the edge of a sheet to be cut.

The cutting assembly is most fully illustrated in FIG. 6 and consists of a rocker arm, generally designated by the numeral 50, which is pivotably mounted between the side plate portions 34, 36 on a transversely extending shaft 52, secured within the body by retaining rings 53. The rocker arm 50 is disposed substantially on the centerline of the body (see FIG. 3) and is operated by an L-shaped trigger, generally designated by the numeral 54, pivotably mounted on the transverse shaft 56, which is supported and retained similarly to shaft 52. A pair of short pins or studs 58, 60 project laterally from the rocker arm 54 at positions spaced one above the other (i.e., disposed generally on a posterior-anterior axis), and the trigger 54 has a foot component 62 which extends between them. As will be appreciated, rearward force upon the upwardly projecting leg component 64 of the trigger 54 will cause movement in the direction indicated by the arrow in FIG. 6, in turn bringing the foot component 62 into contact with the upper stud 58 and thereby urging the rocker arm 50 upwardly, ultimately to the phantom line position illustrated. Force upon the trigger 54 in the opposite direction will cause the foot component 62 to bear upon the lower stud 60, and will thereby serve to maintain the rocker arm 50 in its extended (full line) position, despite the existence of a substantial lifting force.

A head portion 66 is provided at the forward end of the rocker arm 50; it has a rectangular slot 68 extending therethrough on a posterior-anterior axis, and a threaded bore 70 extending longitudinally thereinto from the forward end. A pillar post assembly, generally designated by the numeral 72, is seated within the slot 68, and a retaining plunger assembly, generally designated by the numeral 74, is mounted within the bore 70. The plunger assembly 74 consists of an externally threaded housing 76 through which passes the shaft 78 of a plunger; the latter is biased inwardly (by means not shown), and has an operating knob 80 at one end and a generally spherical tip 82 at the other. The tip 82 is engaged within the tapered transverse groove 84 in the post 86 to retain the assembly 72 within the slot. Because the post 86 is somewhat narrower than the slot 68 (in the longitudinal direction of the arm 50) the pillar post assembly 72 is free to pivot slightly therewithin about the tip of the shaft 78, in turn permitting the blade 88 to shift slightly in the same direction. As will also be appreciated, pulling the knob 80 in the direction of the arrow in FIG. 6 will withdraw the plunger shaft 78 from the groove 84, thereby effecting release of the pillar post assembly.

Figure 7:
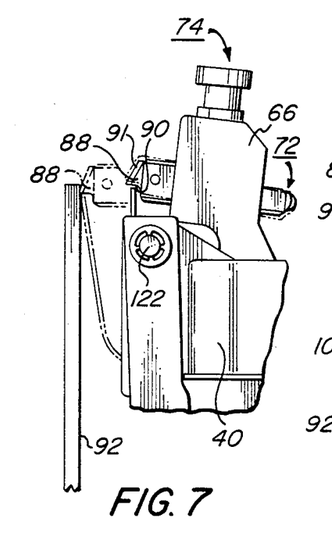
FIG. 7 is a view similar to that of FIG. 6 but illustrating only the forward end portion of the cutting head, the head portion of the rocker arm being shown elevated from the sheet in full line, and being shown returned thereto in phantom line.

The blade 88 has a rectilinear leading edge 90, which is generally parallel to the axis of the post 86, and its point is formed where that edge intersects the slanted edge 91; such a blade is especially adapted for scoring plastic materials. As depicted in FIG. 6, the leading edge 90 is in contact with the edge of the sheet 92 and the pillar post asssembly 72 is slightly canted. With reference to FIG. 7, elevation of the rocker arm 50, by rearward movement of the trigger 54, will disengage the blade 88 from the edge of the sheet 92, permitting it to return to its normal position under the force of the spring acting on the plunger shaft 78; this condition is shown by the full line representation. When the trigger 54 is then released, the rocker arm will resume its extended position, and the point of the blade will be disposed on the sheet 92 but located sliqhtly inwardly of the edge; this relationship is shown in phantom line.

The tail end of the rocker arm 50 carries a machine screw 94, which is threadably engaged in aperture 95 to extend in a posterior direction therethrough. The end of the screw 94 bears upon a reduced diameter portion 96 of a lock-out bolt, generally designated by the numeral 98, which is slidably mounted between the side plate portions 34, 36 of the body (see particularly FIG. 3). This arrangement permits control of the position of the head portion 66 when the rocker arm 50 is extended, adjustments thereto being readily made by threading the screw 94 to a different depth within the aperture 95.

A notched spring steel ramp element 100 is secured to the anterior side of the rocker arm 50 by a pair of suitable fasteners 102 and serves to provide a lead-in with a shallow approach angle, to protect any glass cutting wheel used from damage due to impact upon the edge of the sheet. Projecting upwardly from the opposite side of the arm 50 (see FIG. 6) is a short post 104, which serves to seat one end of a coil spring 106. The other end of the spring 106 is engaged about the tubular portion of a bushing 108, which is in turn seated within a counterbore section (not shown) of the elevated portion 110 of the body. The top wall of the portion 110 has a threaded aperture 112 formed through it, within which is threadably engaged an adjusting screw 114. A reduced diameter end portion 115 of the screw 114 is seated within the throat of the bushing 108, with the shoulder formed at the juncture with the full-diameter section of the screw bearing thereupon. Adjustment of the depth of the screw 114 within the aperture 112 will of course regulate tension upon the spring 106, in turn controlling the downward force upon the rocker arm 50 and ultimately upon the cutting element mounted therein.

The enlarged diameter section 116 of the bolt 98 enables it to serve its lock-out function, which is achieved simply by depressing it inwardly when the rocker arm 50 is in an elevated position. With the bolt depressed, release of lifting force on the trigger 54 will cause the rocker arm 50 to descend to a position in which the adjusting screw 94 bears upon the enlarged section 116, thereby maintaining the head portion 66 in an elevated attitude. The bolt 98 is biased outwardly (by means not shown), and is restrained against dissembly by the transverse pin 118; the biasing force upon the bolt is inadequate to overcome the force of frictional engagement with the screw 94, and the bolt therefore remains in its shifted position until pressure on the screw is relieved, by operation of the trigger 54.

Figure 5:
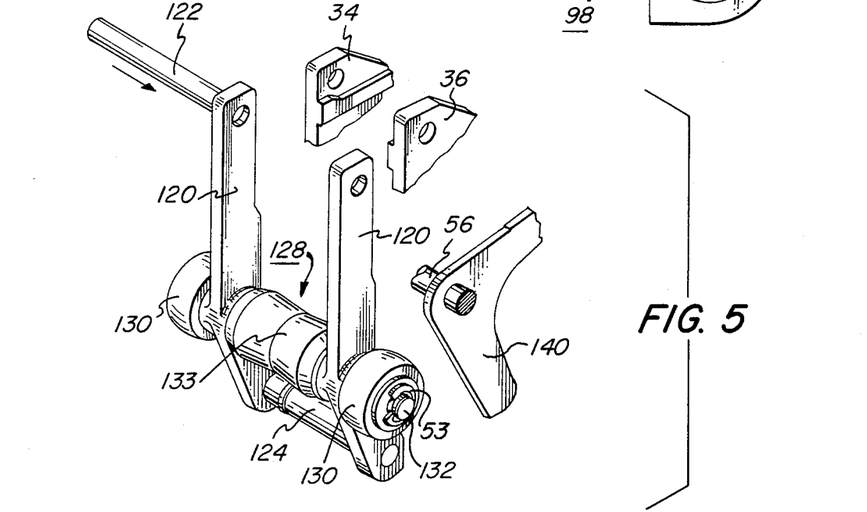
FIG. 5 is a fragmentary, partially exploded perspective view of portions of the breaker assembly of the cutting head.

The breaker assembly of the cutting head comprises a set of three rollers mounted upon a frame or carriage, the latter consisting of a pair of bracket arms 120 pivotably supported upon a shaft 122 extending therethrough and through the side plate portions 34, 36 of the body, and a connecting cross piece or tie rod 124 to which the rearward ends of the arms 120 are attached. A coil spring 126 is fastened at one end to the bar 124, and at its opposite end to the small pin 128 which projects from the side plate portion 34; the spring 126 exerts an upward tension upon the carriage of the breaker assembly, and normally retains it in retracted position against the cutting head body.

The set of rollers consists of an internal roller, generally designated by the numeral 128, and a matched pair of outer rollers 130. The three rollers 128, 130 are rotatably mounted upon the shaft 132, which also passes through the arms 120, the internal roller being disposed therebetween and the external rollers 130 being mounted outwardly thereof. As can be seen, the internal roller 128 has a wide, shallow V-shaped groove 133 extending circumferentially about its midsection, to define symmetrical conical sections thereon. Normally, the tapered surfaces of the conical sections will form an angle of about 170° with one another; i.e., the slope of each surface, relative to the axis of the roller, will generally be about 5°. The exterior rollers 130 are of a wheel-like nature, and are of a larger diameter than the maximum diameter of the internal roller.

The breaker assembly is operated by the L-shaped lever, generally designated by the numeral 134, which consists of an upwardly extending arm component 138 and a foot component 140, at the intersection of which the lever 134 is pivotably mounted, in common with the operating trigger 54, upon the transverse shaft 56. As will be appreciated, rearward force upon the arm component 138 will move the carriage of the breaker assembly downwardly to its extended position, through contact of the foot component 140 upon the tie bar 124, and upon release the coil spring 128 will return the assembly to its retracted position; these positions are shown in FIG. 4 of the drawings.

Figure 8:
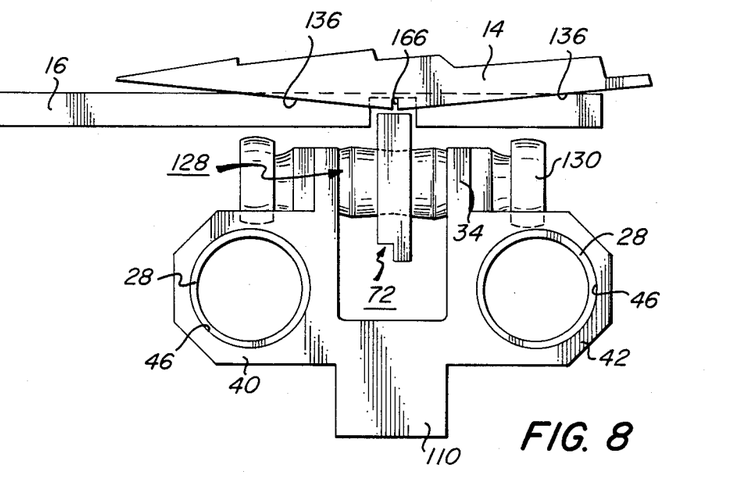
FIG. 8 is a diagrammatical end view of the cutting head with the pillar post in place, mounted upon the tubular rails of the machine and showing the anvil and supporting shelf of the support unit.
Figure 9:
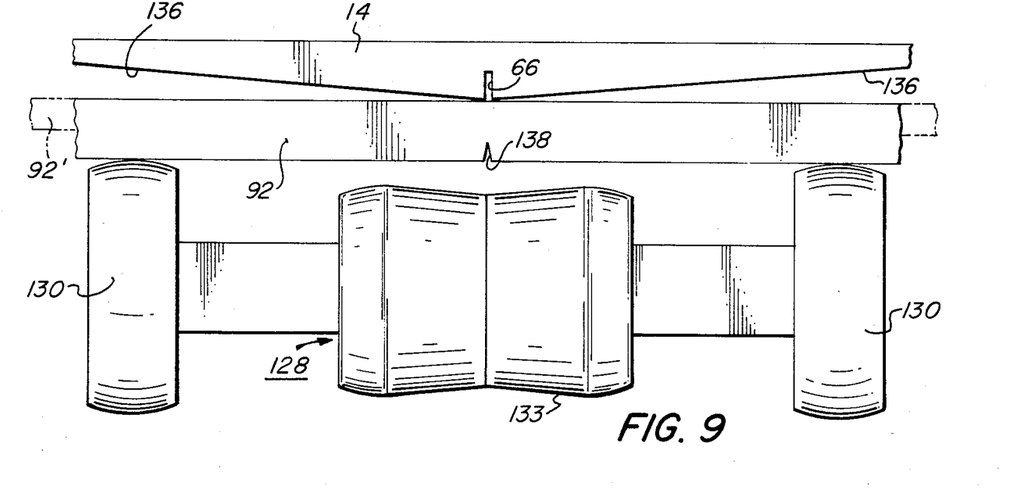
FIG. 9 is a diagrammatical end view showing sheets of scored plastic material positioned over the mandrel of the cutting machine prior to displacement by the rollers of the breaker assembly.
Figure 10:
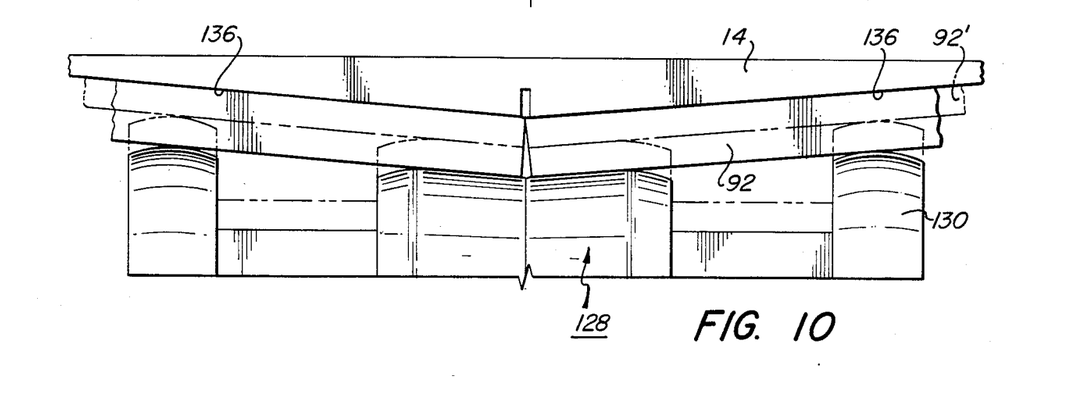
FIG. 10 is a view similar to FIG. 9 in which the rollers are positioned for the breaking operation and the sheets are completely severed.

The FIGS. 8–10, it can be seen that the portion of the vertical mandrel 14 facing the cutter head is of shallow V-shaped cross-section, with the facing surfaces 136 generally forming therebetween the counterpart angle to that formed by the conical surfaces of the internal roller 128. Thus, each of the surfaces 136 will usually have an inclination of about 5°, and will therefore be disposed at an angle of about 190° with respect to one another.

FIGS. 9 and 10 illustrate the break-out operation, and depict in full and phantom line, respectively, sections of plastic sheets 92, and 92', the latter having a thickness half that of the former and both being scored to produce a V-shaped notch or fissure 138 to define the line of severance (only that in the sheet 92 being visible). Upon extension of the breaker assembly (from the position of FIG. 9 to the full and phantom line positions of FIG. 10, depending upon the thickness of the sheet), the outer rollers 130 will initially force the sheet 92, 92' against the slanted faces 136 of the anvil 14. In the case of the thicker sheet 92, this action will generally be sufficient to complete the break-out and to effect severance. The greater flexibility of the thinner sheet 92' will, however, frequently permit it to flex over the anvil 14 without breaking fully; by applying localized force to the sheet, directly over the apex of the anvil, the central roller 128 will overcome that effect, and thereby serve to cleanly complete the break-out.

As will be appreciated, use of the machine to cut plastic will generally involve two passes of the cutting head on the guide rails 28 across the sheet; normally, the support unit will be vertically oriented and the functional strokes will be downwardly made. In the first pass, the rocker arm 50 of the cutting assembly will be extended under the force of the coil spring 106, enabling the cutting element to produce the desired score. At the commencement of the second pass, with the cutting head returned to the top of the sheet, the trigger 54 will be operated to retract the rocker arm, which will be secured in elevated position by shifting the lock-out bolt 98 inwardly to permit the adjusting screw 94 to come to rest upon its enlarged diameter section 116. Then the operating lever 134 will be pulled to extend the breaker assembly, bringing the rollers 128, 130 against the sheet and thereby bending it over the anvil 14. The localized bending moment applied by the rollers 130, 128 will proceed down the sheet as the cutting head is moved through its second stroke, thereby propagating the break and ultimately fully severing the pieces. Glass cutting will normally involve a single pass of the head, followed by a manual breaking step. Although the breaker assembly will not usually be necessary in connection with glass cutting, it may be useful for certain types and thicknesses of glass.

Figure 11:
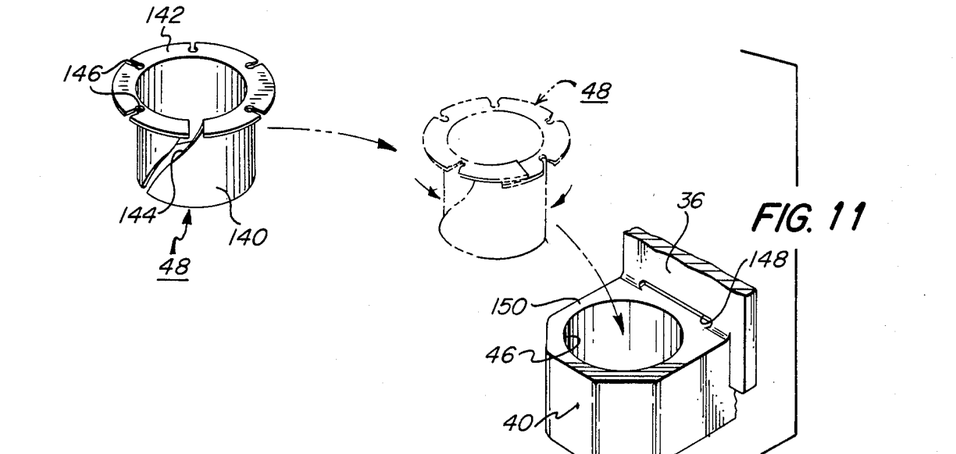
FIG. 11 is an exploded, fragmentary perspective view showing a sleeve bearing element and the associated mount portion of the cutting head, and also showing, in phantom line, the bearing element partially collapsed to facilitate insertion into the bearing mount passageway.

The structure of the sleeve bearing element 48, and the means of its engagement within the passage of the mount portions of the cutting head, are most clearly illustrated in FIGS. 3 and 11 (the construction is the same for all three mount portions of the head, and so the following description will be limited to portion 40). The bearing element 48 consists of a tubular portion 140 and an annular flange portion 142 at one end thereof. A slit 144 extends generally radially through the flange portion 142 and helically along the length of the tubular portion 140, separating the element and permitting relative movement of the marginal portions along the slit. This enables the element to be compressed substantially (as shown in phantom line in FIG. 11), reducing the effective diameter of the sleeve and thereby facilitating its insertion into the passageway 46 through the bearing mount 40; the series of notches 146 around the circumferences of the flange portion 142 also add flexibility and facilitate such temporary deformation.

A longitudinal slot 148 is formed along the intersection of the side plate portion 36 and the perpendicular surface 150 of the bearing mount portion 40, and is dimensioned to receive a circumferential edge section of the annular flange 142. Thus, when compressive force is released and the bearing element resumes its normal condition, the edge of the flange enters the slot 148 and thereby engages the element 48 against displacement from the passageway 46. Obviously, movement in the opposite direction is also restrained by contact of the flange portion 142 upon the surface 150.

As indicated in FIG. 4, the pillar post assembly 72 mounts not only the plastic sheet cutting blade 88, secured thereon by the screw 152, but also supports a glass cutting wheel 154. It will be apparent that the wheel 154 and the blade 88 may be utilized alternatively, simply by inserting the pillar post 86 into the slot 68 in the proper position. A second pillar post assembly 156 is also shown, which consists of the mat cutting blade 158 secured by screw 160 on the pillar post 162; the post has a transverse groove 164 in which the shaft of the retaining plunger 74 is engaged when it is used in the cutting head.

As will be noted, the mat cutting blade 158 is slanted in the direction opposite to that of the blade 88, since it is used to slice through cardboard or foam core mat, rather than to produce a fissure, as in the case of plastic (and glass). The anvil 14 has a groove 166 extending along its apex, which serves to accommodate the blade 158 and provide the clearance necessary for full penetration, thereby enabling complete severance of the mat in a single pass of the cutting head. Because of the direction of slant of the blade 158, however, there is a tendency for the mat to force the cutting member upwardly out of the material, which is of course undesirable from the standpoint of achieving a clean and complete cut through the mat. To overcome this tendency, the operating trigger 54 of the cutting assembly is pressed forwardly into contact with the lower pin 60 on the rocker arm 50, so that manual force can be applied to maintain the fully extended position of the cutting element, as has been generally described hereinabove.

Thus, it can be seen that the present invention provides a novel cutting head, and a novel manual sheet cutting machine in which it is employed, which are highly effective and facile to use for cutting glass, plastic and mat materials, and by which cuts of high quality can readily and consistently be produced. The cutting head and machine are of relatively uncomplicated design and durable construction and are smooth and comfortable in operation.

Having thus described the invention, what is claimed is:

1. A cutting head for use in a manual sheet cutting machine, comprising:
    A. an elongated body having a handle portion thereon and means for supporting said head for movement along a cutting path;
    B. a cutter assembly including
        (1) an elongated rocker arm having a head portion adjacent the forward end of said body, said rocker arm being pivotably mounted on said body for movement of said head portion between downwardly extended and upwardly retracted positions,
        (2) a cutting member having a cutting element thereon,
        (3) means for removably mounting said cutting member on said head portion of said rocker arm, said mounting means cooperating with said cutting member to permit slight longitudinal shifting of said cutting element in a forward direction and to bias said cutting member rearwardly against such shifting,
        (4) means for biasing said rocker arm toward said extended position of said head portion, and
        (5) first operating means on said body, accessible from said handle portion thereof and movable in one direction to elevate said rocker arm from said extended position toward said retracted position of said head portion against said biasing means, and movable in another direction to maintain said rocker arm in said extended position against upward deflection; and
    C. a breaker assembly including
        (1) a carriage pivotably mounted on said body and having a shaft portion extending transversely thereacross, said carriage being movable between downwardly extended and upwardly retracted positions of said shaft portion,
        (2) a set of rollers rotatably mounted on said shaft portion, and comprising
            (a) a generally cylindrical central roller having a shallow circumferential groove extending about the midsection thereof to define thereon oppositely directed inwardly tapered generally conical sections, and
            (b) a matched pair of outer rollers disposed outwardly of the ends of said central roller, said rollers being of a diameter larger than the maximum diameter of said central roller,
        (3) means for biasing said carriage toward said retracted position of said shaft portion, and
        (4) second operating means on said body, accessible from said handle portion thereof, for forcing said carriage toward said extended position against said biasing means; whereby said cutting head can be used for cutting glass, mat, and plastic sheet in a range of thicknesses, said mounting means of said cutter assembly serving to permit forward deflection of said cutting element by contact upon the edge of a sheet, at the commencement of a scoring operation, and to effect repositioning of said element to a point adjacent the edge, and said rollers serving to effectively break the sheet thereafter.

2. The cutting head of claim 1 wherein said supporting means comprises three bearing mount portions, two of said mount portions being longitudinally aligned on one side of said body and the other mount portion being disposed on the opposite side thereof, each of said mount portions having a passageway extending longitudinally therethrough for slidably receiving one of a pair of parallel tubular guide rails and having a separate sleeve bearing element engaged therein for sliding contact upon the guide rail.

3. The cutting head of claim 2 wherein each of said sleeve bearing elements is fabricated from a rigid, resiliently deformable material and comprises a tubular body portion received in said passageway of said mount portion, and an annular flange portion extending outwardly from about one end of said body portion and seated upon the surface of said mount portion about said passageway, said sleeve element being split along one side by a continuous slit extending through said flange portion and generally longitudinally along said body portion to permit movement of the marginal portions of said element into an overlapped relationship, the effective circumferential dimensions thereby being diminished to facilitate insertion of said sleeve element into said passageway of said mount portion in which it is engaged.

4. The cutting head of claim 3 wherein said body of said head has a rectilinear slot adjacent said surface of each of said bearing mount portions and extending perpendicularly to said passage therethrough and parallel to the longitudinal axis of said body, an edge of said annular flange portion of said sleeve bearing element being engaged within said slot to effectively prevent displacement of said sleeve bearing element away from said mount portion surface.

5. The cutting head of claim 4 wherein each of said sleeve bearing elements is fabricated from a synthetic resinous material having a high level of toughness and durability and a low coefficient of friction, and wherein said slit therein extends generally helically along said tubular portion.

6. The cutting head of claim 1 wherein said cutting member comprises a pillar post having said cutting element mounted adjacent one end thereof, said post having a groove extending transversely thereacross intermediate its opposite ends to cooperatively engage said mounting means of said rocker arm head portion, and wherein said mounting means includes a detent member biased into engagement within said groove to secure said cutting member while permitting pivotal movement thereof about said detent member.

7. The cutting head of claim 6 wherein said detent member has a rounded tip portion received in said groove of said pillar post, and wherein said groove is defined by inwardly tapered sidewalls.

8. The cutting head of claim 6 wherein said mounting means of said head portion comprises a slot extending therethrough in a direction generally perpendicular to the longitudinal axis of said rocker arm and to the axis of pivoting thereof, in which said pillar post of said cutting member is seated, said slot being of sufficient dimensions in the longitudinal direction of said rocker arm to permit such shifting of said cutting element, and wherein said detent member comprises a spring-loaded plunger mounted within said head portion.

9. The cutting head of claim 6 wherein said cutting element of said cutting member is especially adapted for scoring of plastic sheet material, and includes a slanted blade which terminates rearwardly at a point formed at the intersection with an edge that extends generally parallel to the longitudinal axis of said pillar post, whereby engagement of said rearward edge upon the edge of the plastic sheet at the commencement of cutting operations causes, as a result of said mounting means construction, said pillar post to pivot and said cutting element to shift forwardly, and whereby elevation of said rocker arm to disengage said cutting element will permit the biasing force of said mounting means to return said cutting element to its normal position, so that upon lowering of said rocker arm said blade point will contact the sheet slightly inwardly of the edge thereof.

10. The cutting head of claim 1 wherein said rocker arm has an elongated adjusting member adjacent the rearward end of said body and extending generally perpendicularly to the axis of pivoting and the longitudinal axis of said rocker arm, said member being adjustable to vary said extended position of said head portion of said rocker arm.

11. The cutting head of claim 10 additionally including a lock-out mechanism to maintain said rocker arm in a position elevated from said extended position thereof, said mechanism comprising an outwardly biased bolt slidably mounted in said body for movement on a transverse axis in alignment for contact by the upper end of said adjusting member, said bolt having a relatively small inner end portion to establish said extended position of said rocker arm by contact of said adjusting member thereon, and having a relatively large outer end portion to similarly establish said elevated position of said rocker arm, the biasing force upon said bolt being inadequate to overcome the frictional force between said larger end portion thereof and said adjusting member in said lock-out position with said bolt inwardly disposed, further elevation of said rocker arm from said lock-out position permitting said bolt to return to its outward position under the biasing force acting thereon.

12. The cutting head of claim 1 wherein said rocker arm includes a pair of stud elements projecting one above the other laterally from one side thereof, and wherein said first operating means includes a foot component extending generally longitudinally between said laterally projecting elements, so that force in one direction upon said first operating means will cause said foot component to contact the upper one of said projecting elements to elevate said rocker arm, and force thereupon in the opposite direction will effect contact with the lower projecting element to exert a downward bias upon said rocker arm and to thereby maintain said extended position thereof against upward deflection.

13. The cutting head of claim 12 wherein said first operating means comprises a generally L-shaped trigger, one component thereof providing said foot component and a generally perpendicular arm component thereof being disposed to permit thumb-contact access from said handle portion of said elongated body, said trigger being pivotably supported on said body substantially at the intersection of said foot and arm components.

14. The cutting head of claim 1 wherein said carriage of said breaker assembly comprises a pair of lateral side arms pivotably attached to said elongated body adjacent said forward end thereof and supporting said shaft portion in a position spaced rearwardly therefrom, said central roller being mounted between said arms and said outer rollers being disposed outwardly thereof, said carriage additionally including a transversely extending tie bar for cooperative engagement and actuation by said second operating means.

15. The cutting head of claim 14 wherein said second operating means comprises a generally L-shaped lever having a longitudinal foot component, for contacting said tie bar of said carriage, and a generally perpendicular arm component disposed to permit thumb contact access from said handle portion of said body, said lever being pivotably attached to said body substantially at the intersection of said foot and arm components.

16. The cutting head of claim 1 wherein said conical sections of said central roller of said breaker assembly are tapered at an angle of approximately five degrees, said circumferential groove extending thereabout thereby having a wide, generally V-shaped cross-sectional configuration with an angle of approximately 170° between the adjacent surfaces of said sections.

17. A manual sheet cutting machine including a cutting head and a support unit therefor; said support unit including an elongated base portion comprised of an anvil of generally V-shaped cross-section, and a pair of parallel rigid tubes disposed adjacent thereto; and said cutting head comprising:
A. an elongated body having a handle portion thereon and means for supporting said head for sliding movement on said tubes along a cutting path aligned over said anvil;
B. a cutter assembly including
 (1) an elongated rocker arm having a head portion adjacent the forward end of said body, said rocker arm being pivotably mounted on said body for movement of said head portion between downwardly extended and upwardly retracted positions,
 (2) a cutting member having a cutting element thereon,
 (3) means for removably mounting said cutting member on said head portion of said rocker arm, said mounting means cooperating with said cutting member to permit slight longitudinal shifting of said cutting element in a forward direction and to bias said cutting member rearwardly against such shifting,
 (4) means for biasing said rocker arm toward said extended position of said head portion, and (5) first operating means on said body, accessible from said handle portion thereof and movable in one direction to elevate said rocker arm from said extended position toward said retracted position of said head portion against said biasing means, and movable in another direction to maintain said rocker arm in said extended position against upward deflection; and C. a breaker assembly including
  (1) a carriage pivotably mounted on said body and having a shaft portion extending transversely thereacross, said carriage being movable between downwardly extended and upwardly retracted positions of said shaft portion,
  (2) a set of rollers rotatably mounted on said shaft portion, and comprising
    (a) a generally cylindrical central roller having a shallow circumferential groove extending about the midsection thereof to define thereon oppositely directed inwardly tapered generally conical sections, and
    (b) a matched pair of outer rollers disposed outwardly of the ends of said central roller, said rollers being of a diameter larger than the maximum diameter of said central roller,
  (3) means for biasing said carriage toward said retracted position of said shaft portion, and
  (4) second operating means on said body, accessible from said handle portion thereof, for forcing said carriage toward said extended position against said biasing means; whereby, by suitable selection of said cutting member, said machine can be used for cutting glass, mat, and plastic sheet materials.

18. The machine of claim 17 wherein said base portion has means thereon for affixing said support unit with said base portion vertically oriented, and wherein said support unit additionally includes a sheet-supporting member disposed adjacent the lower end of said base portion and projecting at a right-angle thereto, said sheet-supporting member providing, with said base portion so oriented, a horizontal shelf on which the sheet material can be disposed during the cutting operation.

19. The machine of claim 18 wherein said sheet-supporting member includes a squaring edge bar extending therealong and providing direct underlying support for the sheet, said squaring edge bar being adjustable with respect to the remainder of said supporting member to permit angular adjustment relative to said base portion.

20. The machine of claim 17 wherein said anvil is rectilinear, and wherein the surfaces thereof facing said cutting head lie at an angle, with respect to one another, that is substantially the counterpart to that formed between said conical sections of said central roller of said breaker assembly.

* * * * *